United States Patent
Bazil et al.

[19]

[11] Patent Number: 6,105,880
[45] Date of Patent: Aug. 22, 2000

[54] MIXING BLOCK FOR MIXING MULTI-COMPONENT REACTIVE MATERIAL COATING SYSTEMS AND AN APPARATUS USING SAME

[75] Inventors: Kurt D. Bazil, Akron; William G. Warner, II, Fairlawn, both of Ohio

[73] Assignee: The Sherwin-Williams Company, Cleveland, Ohio

[21] Appl. No.: 09/219,819

[22] Filed: Dec. 23, 1998

Related U.S. Application Data

[60] Provisional application No. 60/071,691, Jan. 16, 1998.

[51] Int. Cl.[7] .................................................. B05B 15/02
[52] U.S. Cl. ......................... 239/112; 239/104; 239/302; 239/303; 239/427; 239/433
[58] Field of Search ................................... 239/302, 303, 239/304, 104, 112, 427, 431, 433

[56] References Cited

U.S. PATENT DOCUMENTS

| | | | |
|---|---|---|---|
| 3,146,950 | 9/1964 | Lancaster | 239/112 X |
| 3,929,318 | 12/1975 | Saidla | 259/4 |
| 4,053,141 | 10/1977 | Gussefeld | 366/339 |
| 4,093,188 | 6/1978 | Horner | 366/336 |
| 4,163,523 | 8/1979 | Vincent | 239/112 X |
| 4,222,671 | 9/1980 | Gilmore | 366/337 |
| 4,264,212 | 4/1981 | Tookey | 366/3 |
| 4,848,920 | 7/1989 | Heathe et al. | 366/339 |
| 5,053,202 | 10/1991 | Dwyer et al. | 422/135 |
| 5,176,925 | 1/1993 | Weber et al. | 425/191 |
| 5,178,326 | 1/1993 | Kukesh et al. | 239/8 |
| 5,182,361 | 1/1993 | Maria van Hout et al. | 528/371 |
| 5,221,710 | 6/1993 | Markusch et al. | 524/591 |
| 5,255,974 | 10/1993 | Signer | 366/336 |
| 5,294,052 | 3/1994 | Kukesh | 239/427 X |
| 5,413,253 | 5/1995 | Simmen | 222/137 |
| 5,425,581 | 6/1995 | Palm | 366/339 |
| 5,462,405 | 10/1995 | Szucs | 134/7 |
| 5,489,153 | 2/1996 | Berner et al. | 366/337 |
| 5,500,160 | 3/1996 | Suess | 261/79.2 |
| 5,520,331 | 5/1996 | Wolfe | 239/8 |
| 5,620,252 | 4/1997 | Maurer | 366/337 |
| 5,688,047 | 11/1997 | Signer | 366/337 |
| 5,779,361 | 7/1998 | Sugiura | 366/340 |

FOREIGN PATENT DOCUMENTS

| | | | |
|---|---|---|---|
| 195 11 603 A1 | 10/1996 | Germany. | |
| 197 46 583 A1 | 4/1999 | Germany. | |
| 46600 | 9/1910 | United Kingdom | 239/427 |
| 2037621 | 7/1980 | United Kingdom | 239/112 |

*Primary Examiner*—Andres Kashnikow
*Assistant Examiner*—Robin O. Evans
*Attorney, Agent, or Firm*—Robert E. McDonald; Vivien Y. Tsang; Joseph J. Crimaldi

[57] ABSTRACT

The present invention provides a mixing block for mixing fluid components of a multi-component system and which includes at least two component inlets, wherein each component inlet receives a respective component or components of the multi-component system; and a solvent inlet, wherein the solvent inlet receives solvent for use in cleaning the mixing block. The mixing block further includes at least two flow channels, which intersect, wherein an upstream end of each of the intersecting flow channels is connected to at least one of the component inlets and a downstream end of each of the intersecting flow channels is connect to a mixed material reservoir, wherein the mixed material reservoir is further connected to and supplies mixed material to an outlet. The mixing block also includes a solvent chamber which is connected to both the solvent inlet and the upstream ends of the intersecting flow channels and a solvent diverter which diverts solvent back into the component inlets to facilitate cleaning of the component inlets as well as the intersecting flow channels, mixed material reservoir and outlet. Additionally, an apparatus which utilizes the above described mixing block is also disclosed.

33 Claims, 11 Drawing Sheets

FIG. 4
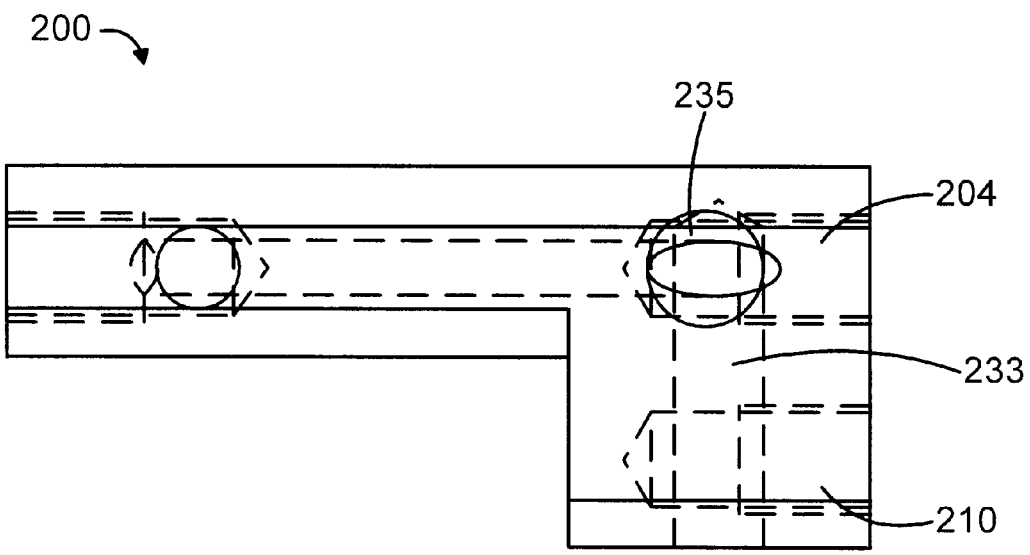
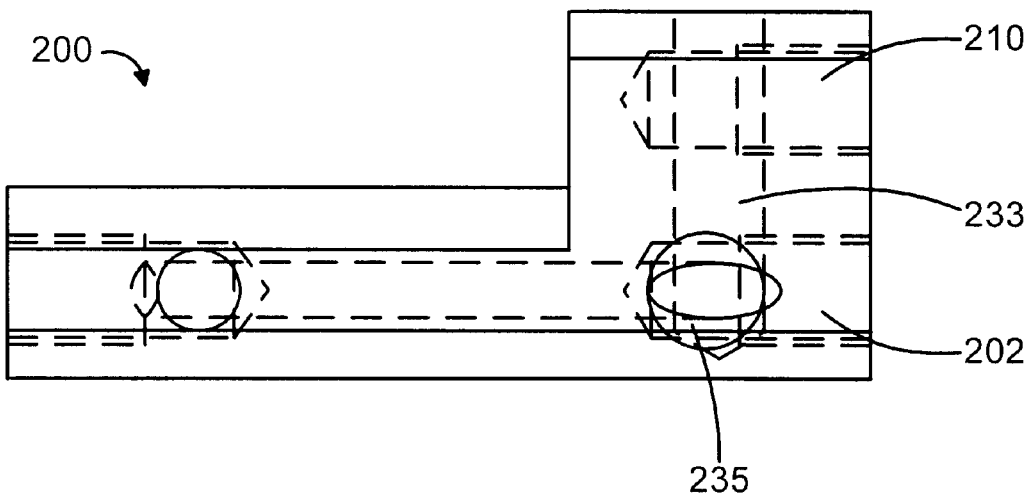
FIG. 3

MIXING BLOCK FOR MIXING MULTI-COMPONENT REACTIVE MATERIAL COATING SYSTEMS AND AN APPARATUS USING SAME

This application claims benefit of provisional application Ser. No. 60/071,691 filed Jan. 16, 1998.

TECHNICAL FIELD

The present invention generally relates to a mixing block for mixing the components of multi-component systems, such as multi-component coating systems, and to an apparatus using such a mixing block. In particular, the present invention employs a mixing block with at least two intersecting flow channels and a solvent inlet at the upstream end of the intersecting flow channels to provide a thorough cleaning to the mixing block. The mixing block can be utilized for mixing any multi-component system in which fluid components must be mixed prior to use. Representative uses include admixing of chemically reactive components such as reactive coatings, foams and plastics; the addition of catalysts, accelerators, dyes or other additives to monomers or polymers; the addition of plasticizers to fluid resins and other applications.

BACKGROUND OF THE INVENTION

Various chemically reactive coating compounds which are characterized by the occurrence of a chemical reaction during the mixing of the compounds are known in the art. A number of these chemically reactive materials are multi-component systems typically involving two or more materials which react upon mixing. Representative multi-component systems include isocyanate/hydroxyl, anhydride/hydroxyl, aminelepoxy and other reactive systems well known in the art. In a clearcoat system comprising a hydroxy functional polymer as the first component and a polyisocyanate as a second component, for example, the two coating components must be mixed prior to their being supplied to a spray gun for application onto a desired surface such as an automobile body. If the mixed materials have a sufficiently long pot life, they can be mixed in a container and applied in a conventional manner. If the materials react very quickly, as is frequently desirable, however, the usable time period after mixing may be very short, and the materials must be mixed immediately prior to application. In such a case, generally the two coating components mix in a T-shaped mixing chamber which the two coating components enter separately, through coating component inlets, on opposite sides of the top of the T. They mix when they meet in a reservoir at the top of the T and as they join and flow out of the bottom of the T into a single supply line which leads to the spray gun. The spray gun applies the mixed material through the use of compressed air to atomize the mixed material.

In addition to the two coating component inlets mentioned above, most T-shaped mixing chambers have a third inlet, for solvent, which is generally placed at the bottom of the T. T-shaped mixing blocks normally permit a user to select between a mixing function and a cleaning function by manually shifting of coating component valves and a solvent valve. In order to switch from a multi-component coating system to solvent a user first rotates both coating component valve levers at the mixing block ninety degrees (90°) in order to shut off the flow of coating components to the T-shaped mixing block. In order to accomplish this a user usually has to put down the spray gun in order to manipulate the valve levers. Then to start solvent to flowing into the T-shaped mixing block a user must switch over the pump on the supply station from supplying coating components to supplying solvent. This is generally accomplished by toggling a pneumatic switch (when the pump is air driven) which shuts off air to the coating component pumps and turns on air to the solvent pump. As a result, a user is required to actuate two sets of valves at different locations in order to accomplish the task of cleaning the conventional T-shaped mixing block. Such a task is both awkward and time consuming.

As discussed above, the solvent necessary for cleaning is supplied to a T-shaped mixing block via a solvent inlet which is connected to a solvent supply line. Since the inlet for solvent is usually at the bottom of the T-shaped mixing chamber of a T-shaped mixing block, generally only the T-shaped mixing chamber is throughly cleaned, and coating component inlets and their control valves may not be thoroughly cleaned. This may result in the buildup of reactive coating components or contamination between different multi-component systems.

In addition, if a T-shaped mixing block is removed from the coating component and solvent supply lines, there is a considerable amount of waste generated by coating components and solvent which remain in the supply lines. Normally, purging all of the hoses in a system utilizing a T-shaped mixing block as described above can generate approximately 1600 ml of total waste in a system with 50 feet of hose (per supply line). Purging the supply lines increases the cost to the user of such a system. Furthermore, such multi-component coating systems and the solvents used to clean the equipment are usually treated as hazardous wastes, so minimizing waste reduces disposal costs.

Furthermore, a T-shaped mixing block may suffer from sputtering and/or pump pulsation problems at low pump pressures due to a cycling effect. The cycling of the pump in the supply station may cause a fluctuation in pump pressures which may lead to uneven application of a mixed material by a user.

In addition, a T-shaped mixing block usually has to be mounted on a spray gun for support. Positioning a T-shaped mixing block on a spray gun restricts the range of motion of the spray gun. Such a restriction in the motion of a spray gun may require a user to utilize awkward positions in order, for example, to paint wheel wells or under panels on automobiles.

Consequently, there is a strong need in the art for a mixing block which: maximizes the mixing of coating components of a multi-component system, permits the automatic cleaning of the inlet valves by the solvent, is effective in low pressure applications by preventing sputtering and/or pump pulsation, permits placement of the mixing block a significant distance away from the spray gun.

SUMMARY OF THE INVENTION

The present invention provides for a mixing block with at least two intersecting flow channels and an apparatus which utilizes such a mixing block. The mixing block of the present invention reduces sputtering and/or pump pulsation even at relatively low pump pressures, increases the premixing of coating components of a multi-component system, and eliminates the need for coating component flow control valves in the mixing block. The mixing block of the present invention also minimizes the amount of waste generated and permits the mixing chamber and mixing block to be positioned a significant distance from a spray gun. Such positioning greatly improves the maneuverability of the spray gun.

In a preferred embodiment the present invention comprises a mixing block for mixing components of a multi-component system. The mixing block includes at least two component inlets which each receive a component (or multiple components) of the multi-component system. The mixing block has two flow channels which lead from the component inlets to a mixed material reservoir. The flow channels intersect to form an X-shaped mixing area. The down stream end of each flow channel connects to the mixed material reservoir which is a hollow chamber near the outlet end of the mixing block. The mixed material reservoir empties into a supply line that supplies a spray gun with mixed material to be applied to any suitable surface. The mixing block also includes a solvent inlet adjacent to the component inlets where solvent can enter the mixing block to clean the inside of the mixing block.

In another embodiment, the mixing block of the present invention can also contain a solvent inlet and a hemispherical solvent diverter which directs solvent toward the component inlets in order to clean them.

In still another aspect, the present invention provides a mixing block for mixing components of a multi-component system and which includes at least two component inlets, wherein each component inlet receives a respective component or components of the multi-component system. The block also includes a solvent inlet, which receives solvent for use in cleaning the mixing block. The mixing block further includes at least two flow channels, which intersect. The upstream end of each of the intersecting flow channels is connected to at least one of the component inlets and the downstream end of each of the flow channels is connected to a mixed material reservoir. The mixed material reservoir is further connected to and supplies mixed material to an outlet. The mixing block also includes a solvent passage which is connected to both the solvent inlet and the upstream ends of the intersecting flow channels and a solvent diverter which directs some solvent back into the component inlets to facilitate cleaning of the component inlets as well as the intersecting flow channels, mixed material reservoir and the outlet.

In still another embodiment, the mixing block of the present invention may contain any number of component inlets. Furthermore, the mixing block may also contain any number of intersecting flow channels.

In still another embodiment the mixing block of the present invention may be incorporated into a spray gun.

In addition, the present invention provides, in one embodiment, for a mixing block, as described above, which contains intersecting flow channels which are tapered so as to decrease in size toward their downstream ends.

According to another aspect of the present invention, an apparatus for applying a multi-component system includes the above described mixing block and at least one of each of a storage device, a pump, a conduit and an application device which store, pump, supply and apply the components of the multi-component system to a surface after they have been mixed by the mixing block.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other advantages and novel features of the invention will become apparent from the following detailed description of the invention when considered in conjunction with the drawings, wherein like reference numerals are used to refer to like elements throughout.

BRIEF DESCRIPTION OF THE DRAWINGS

FIG. 3 is side view of the mixing block of FIG. 2;

FIG. 4 is the other side view of the mixing block of FIG. 2;

DESCRIPTION OF THE PREFERRED EMBODIMENTS

Figure 1:
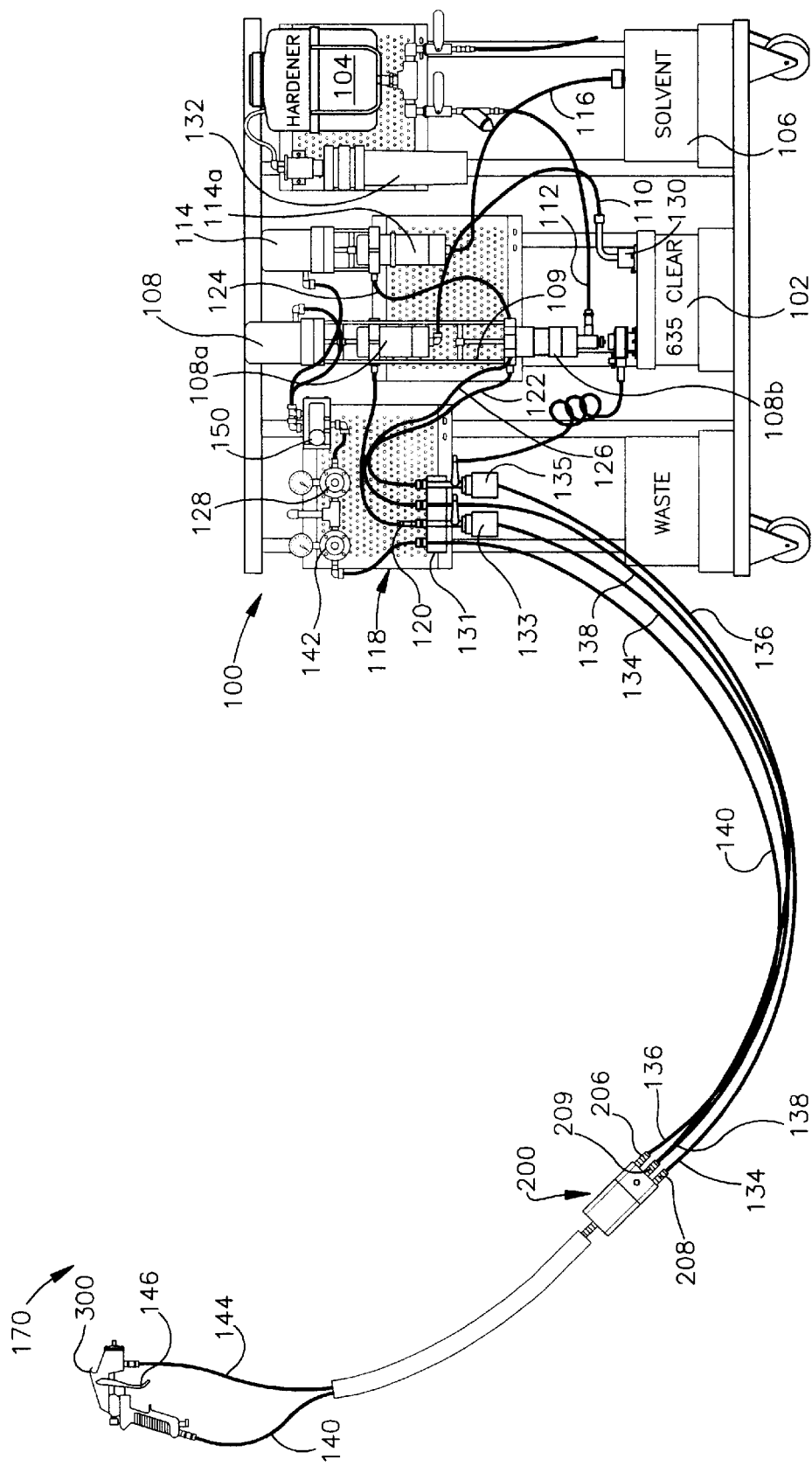
FIG. 1 illustrates an apparatus for applying a multi-component coating system, which utilizes the mixing block of the present invention.

FIG. 1 shows a supply station 100, a mixing block 200 and a spray gun 300. The supply station 100 provides each of the various coating components and solvent to the mixing block 200 where they are mixed before flowing to the spray gun 300.

Mixing block 200 (FIG. 2A) can be constructed from any suitable material. Preferably, mixing block 200 is made of either metal or a suitable plastic. Any suitable metal may be used for mixing block 200, preferably the metal used for the mixing block 200 is selected from the one of the following: aluminum, brass, copper, magnesium, nickel, steel, stainless steel or titanium or alloys or mixtures containing these. When mixing block 200 is constructed from plastic, the plastic used for mixing block 200's construction should be chosen so that it is resistant to attack by the coating components and solvent of the multi-component coating system. Such plastics are known to those skilled in the art, for example, high density polypropylene, may be used to construct mixing block 200. Preferably, mixing block 200 is made from a light weight, corrosion resistant material, such as aluminum. The exterior shape of mixing block 200 is not critical. Accordingly mixing block 200 may be any desired shape and is pictured as rectangular in plan view (FIG. 2A) and L-shaped in elevation view (FIGS. 3 and 4) as an example.

Mixing block 200 in one embodiment has, at its upstream end (the end through which unmixed coating components enter), coating component inlets 202 and 204. Coating component inlets 202 and 204 are internally threaded holes which lead into mixing block 200 at its upstream end and permit coating components of a multi-component coating system to enter mixing block 200.

Each coating component inlet, 202 and 204, is connected through suitable means to respective supply lines 136 and 134 (FIG. 1). The supply lines may be directly screwed into the coating component inlets, 202 and 204. Alternatively, conventional quick release couplings, 206 and 208 (FIG. 1), may be used. Using this arrangement, mixing block 200 can be easily connected and disconnected from its coating component supply lines. In such an embodiment, when mixing block 200 is connected to coating component supply lines, coating components of the multi-component coating system enter mixing block 200 from their respective supply lines through quick release couplings 206 and 208, and coating component inlets 202 and 204, respectively.

Figure 2A:
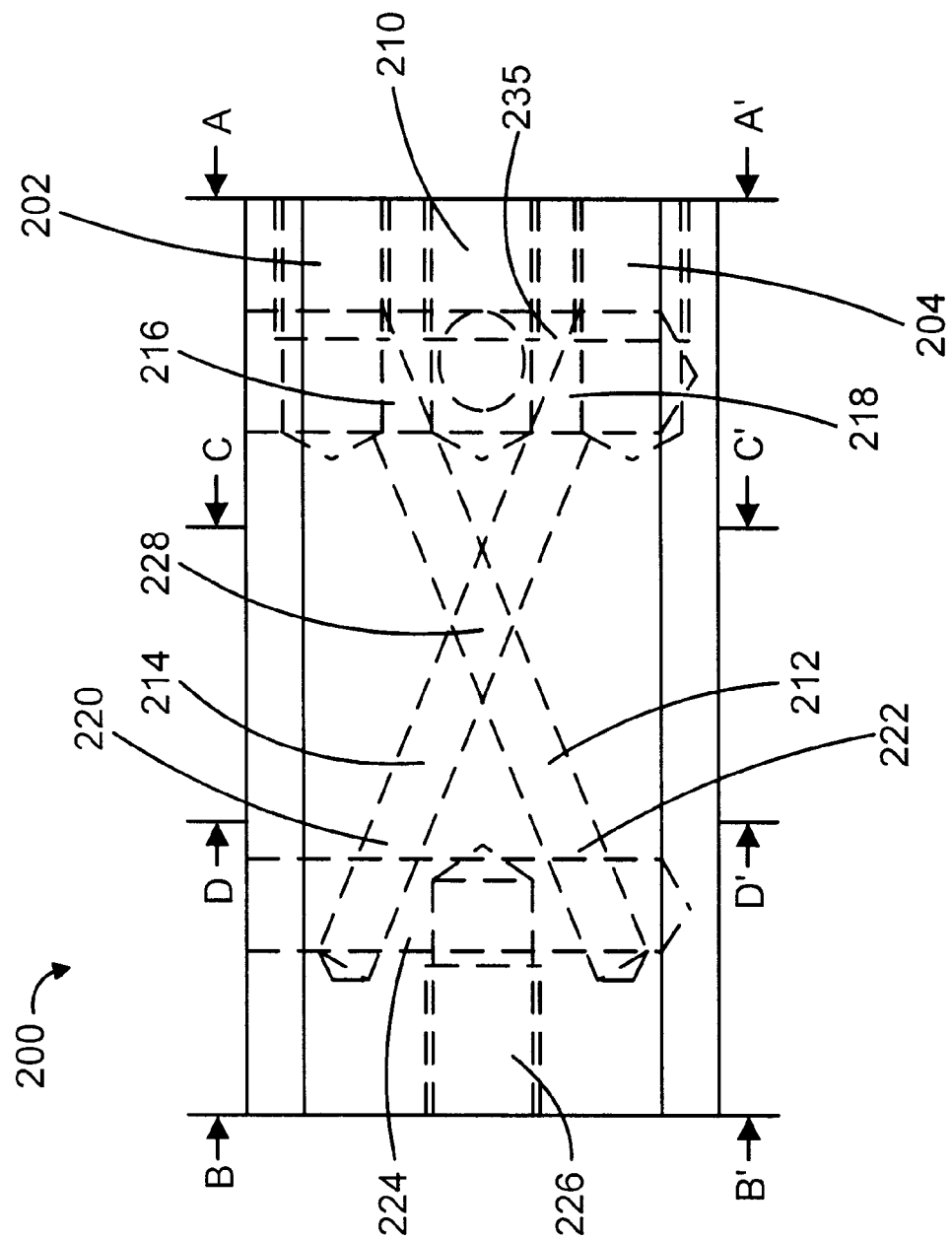
FIG. 2A is a top view of a mixing block in accordance with an embodiment of the present invention.

In addition, mixing block 200 also has at least one solvent inlet 210 (FIG. 2A). The solvent inlet 210 is also at mixing block 200's upstream end. Preferably, a quick release coupling 209 (FIG. 1) is used to connect a solvent supply line 138, in the manner described above, to supply mixing block 200 with solvent.

Quick release couplings are advantageous when compared to threaded couplings because quick release couplings are available with an internal check valve. Preferably quick release couplings with a check valve in each half are used. Quick release couplings save the reactive coating components and solvent that is contained within the supply lines, whenever mixing block 200 is removed for any reason from the supply lines. Also the check valves on the mixing block 200 allow a user to save the mixed reactive coating components in supply hose 144 between the mixing block 200 and the spray gun 300. If the user does not want to save the mixed reactive coating components in supply hose 144 there is a minimal amount of waste because only the relatively short supply hose 144 between the mixing block 200 and the spray gun 300 needs to be emptied. This feature reduces the amount wasted material which has to be disposed of properly.

The mixing block 200 (FIG. 2A) has two flow channels 212 and 214. An upstream end, 216 and 218, of each flow channel 212 and 214 is connected to the inner end of a respective coating component inlet, 202 and 204. The flow channels 216 and 218 intersect at approximately a 45° angle forming a mixing chamber 228. At their downstream ends 220 and 222 the flow channels 212 and 214 connect to a mixed material reservoir 224. Mixed material reservoir 224 has an outlet 226 from which a flexible supply hose 144 (FIG. 1) carries the mixed coating components to the spray gun 300 (FIG. 1).

Figure 2B:
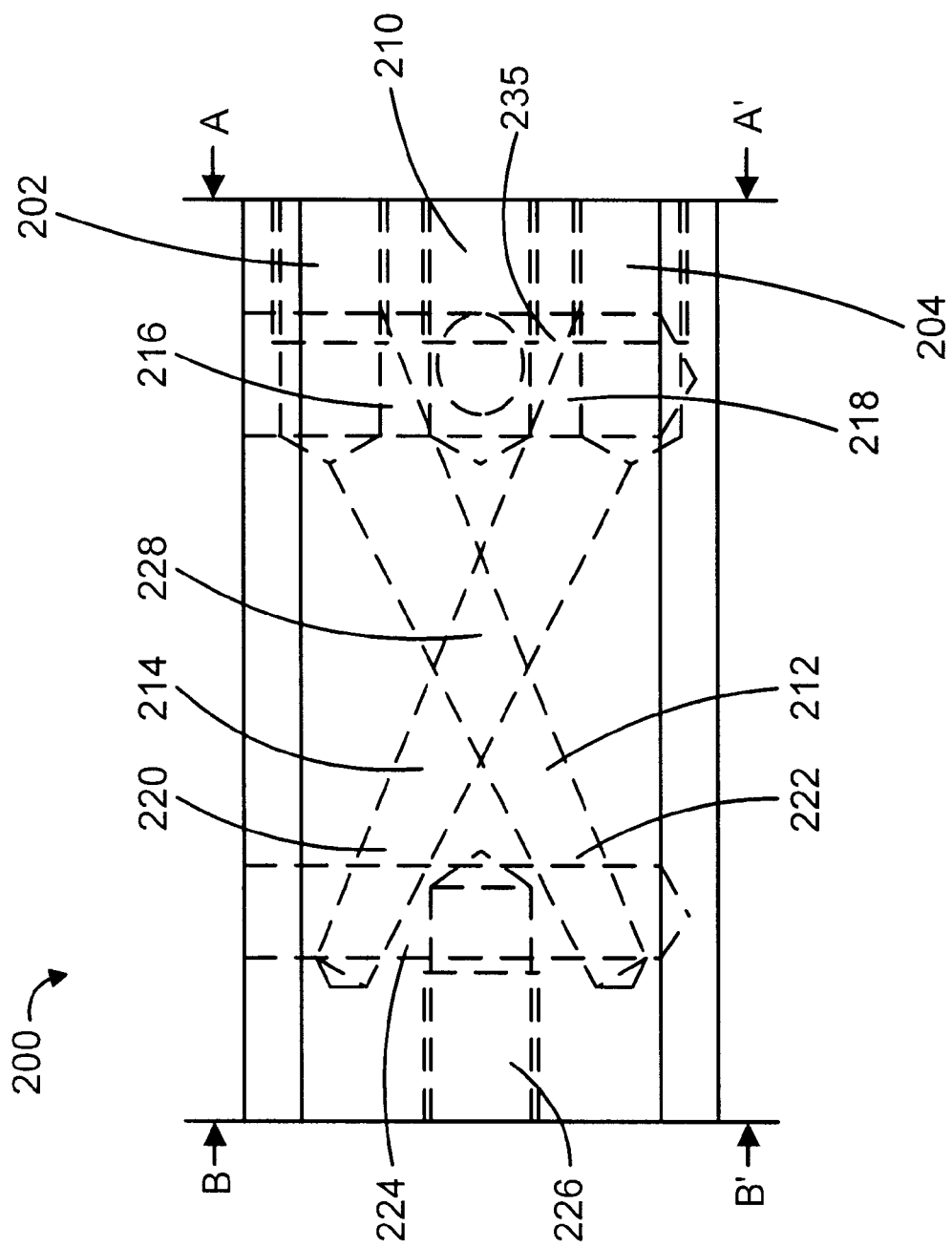
FIG. 2B is a top view of a mixing block in accordance with another embodiment of the present invention.
Figure 2C:
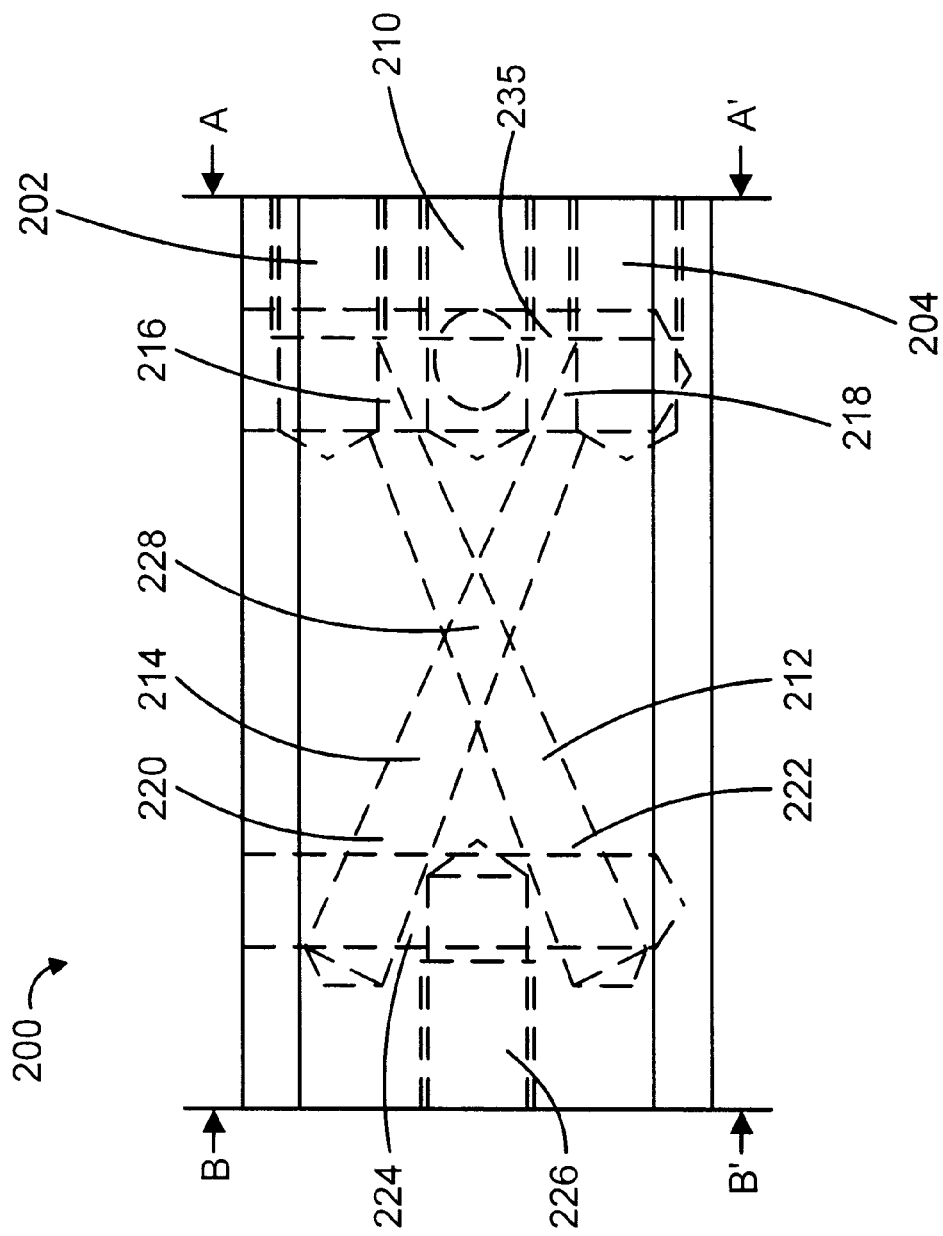
FIG. 2C is a top view of a mixing block in accordance with another embodiment of the present invention.
Figure 8A:
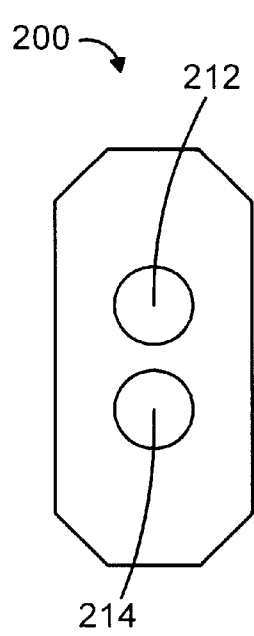
FIG. 8A is a cross section view, along the C–C' line, of the mixing block of FIG. 2A illustrating one embodiment in which the intersecting flow channels have circular cross sections.
Figure 8B:
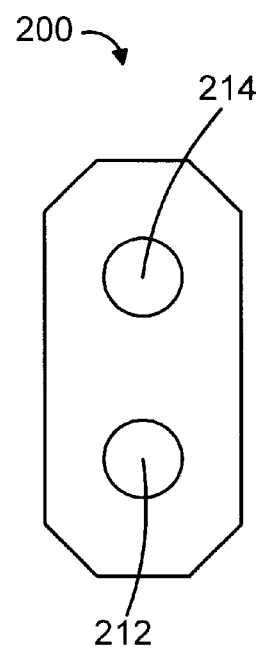
FIG. 8B is a cross section view, along the D–D' line, of the mixing block of FIG. 2A illustrating one embodiment in which the intersecting flow channels have circular cross sections.
Figure 9A:
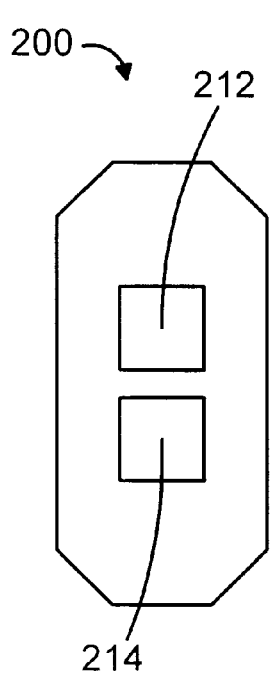
FIG. 9A is a cross section view, along the C–C' line, of the mixing block of FIG. 2A illustrating another embodiment in which the intersecting flow channels have square cross sections.
Figure 9B:
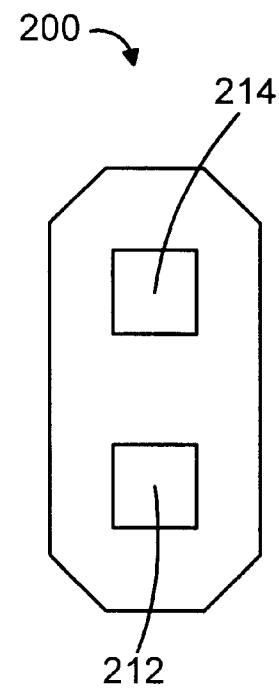
FIG. 9B is a cross section view, along the D–D' line, of the mixing block of FIG. 2A illustrating another embodiment in which the intersecting flow channels have square cross sections.
Figure 10A:
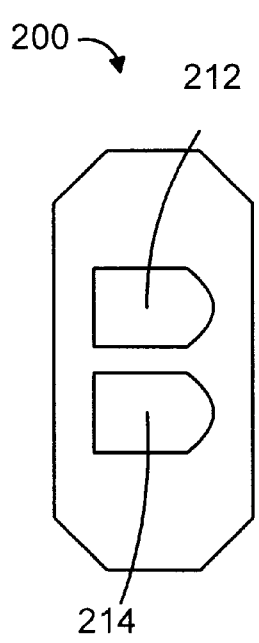
FIG. 10A is a cross section view, along the C–C' line, of the mixing block of FIG. 2A illustrating another embodiment in which the intersecting flow channels have substantially U-shaped cross sections.
Figure 10B:
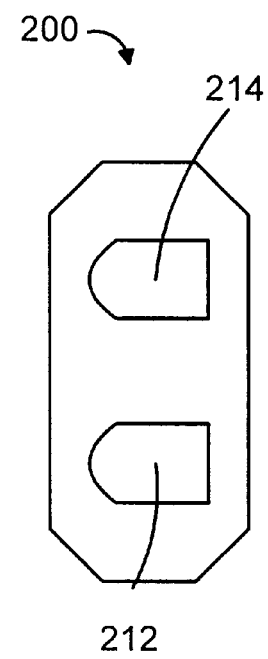
FIG. 10B is a cross section view, along the D–D' line, of the mixing block of FIG. 2A illustrating another embodiment in which the intersecting flow channels have substantially U-shaped cross sections.
Figure 11A:
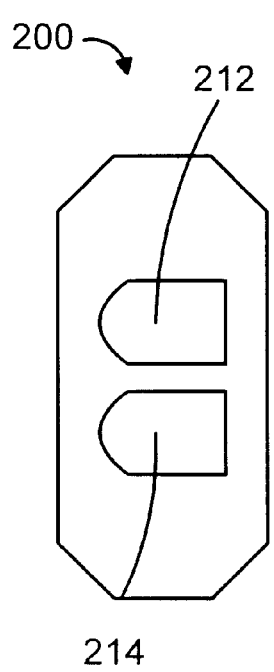
FIG. 11A is a cross section view, along the C–C' line, of the mixing block of FIG. 2A illustrating still another embodiment in which the intersecting flow channels have substantially U-shaped cross sections.
Figure 11B:
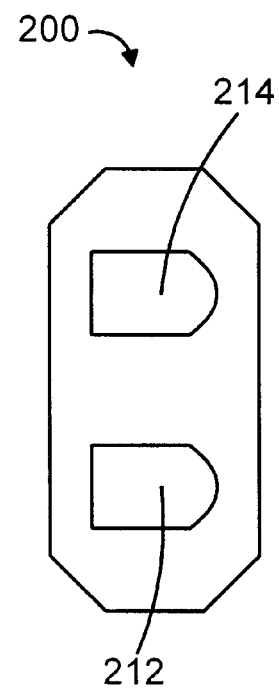
FIG. 11B is a cross section view, along the D–D' line, of the mixing block of FIG. 2A illustrating still another embodiment in which the intersecting flow channels have substantially U-shaped cross sections.

Intersecting flow channels 212 and 214 depicted in FIGS. 8A and 8B) because they are drilled through block 200. Alternatively, intersecting flow channels 212 and 214 can be any desired shape, such as square (see FIGS 9A and 9B), U-shaped (see FIGS. 10A–11B), polygonal, etc., although different manufacturing techniques would be required. Intersecting flow channels 212 and 214 need not be uniform in cross-section from their upstream ends to their downstream ends, rather intersecting flow channels 212 and 214 may be tapered, or any other desired shape. If the mixing block 200 is made by casting, any suitable core can be used to obtain the desired channel configuration. If tapered, the smaller diameter or sized end of intersecting flow channels 212 and 214 may be situated at either their upstream ends 216 and 218 (see FIG. 2C) or their downstream ends 220 and 222 (see FIG. 2B), respectively. In addition, the shape of all of the flow channels need not conform to one standard. Instead it is within the scope of the present invention that there could be any number of differently shaped flow channels within the same mixing block. There is only one requirement for the flow channels, that they intersect. Such design choices are made based upon the coating components used, the flow rates desired, the relative required quantities of each of the components, the amount of energy desired to be imparted to each coating component and/or the amount of mixing necessary for the multi-component coating system.

Intersecting flow channels 212 and 214 join to form a mixing chamber 228. Mixing chamber 228 is the cavity surrounding the intersection point of the axes of the intersecting flow channels 212 and 214. The intersecting flow channels 212 and 214 cause the coating components flowing in them to collide with one another thereby initiating the mixing process. After passing through mixing chamber 228 each intersecting flow channel, 212 25 and 214, delivers the at least partially mixed coating components to mixed material reservoir 224. The coating components are further mixed in the mixed material reservoir 224. An outlet 226 from the mixed material reservoir 224 delivers mixed material to spray gun supply line 146 which in turn supplies mixed material to spray gun 300 for application.

Intersecting flow channels 212 and 214, as depicted in FIG. 2A, form an X-shaped mixing chamber. However, the present invention is not limited to just an X-shaped mixing chamber. Alternatively, the two intersecting flow channels could be at a more acute angle, e.g. 25° or could form a "plus" configuration (90° angle of intersection) or any other configuration which enables the flow channels to intersect at some point between their upstream and downstream ends. Furthermore, there may exist more than two intersecting flow channels in mixing block 200 thereby forming a multitude of X-shaped mixing chambers within mixing block 200. Such a design would be useful where the multi-component coating system contains more than two coating components which must be mixed together or where it is desirable to subject a two coating component system to additional mixing. In the case where more than two coating components are to be mixed it may be preferable, although not required, that each coating component of the multi-component coating system have its own separate coating component inlet into the mixing block 200 so that all mixing occurs in mixing block 200.

Intersecting flow channels 212 and 214 and mixed material reservoir 224 can be created by any suitable means, such as, drilling holes into mixing block 200. Alternatively, a router or milling machine with any suitable bit, for example, a square bottomed or rounded bit may be used to create intersecting flow channels 212 and 214 by routing out the desired intersecting flow channels and then securing a cover to mixing block 200 with suitable seals after completion of all machining. Mixed material reservoir 224 can be formed by any suitable means, such as drilling a blind hole into the side of mixing block 200 and sealing off the entry hole; or machining out a channel in mixing block 200 which connects the downstream ends 220 and 222 of intersecting flow channels 216 and 218.

Figure 6:
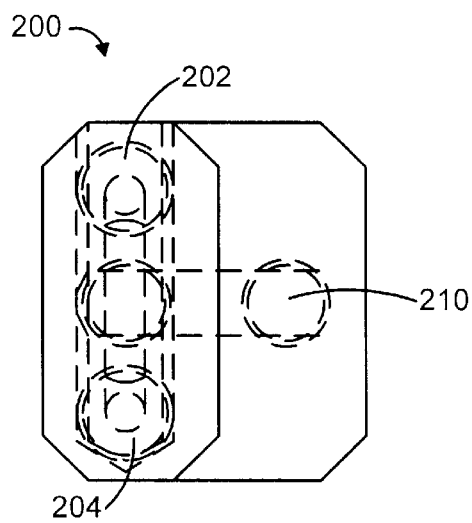
FIG. 6 is an end view, along the B–B' line, of the mixing block of FIG. 2A.
Figure 5:
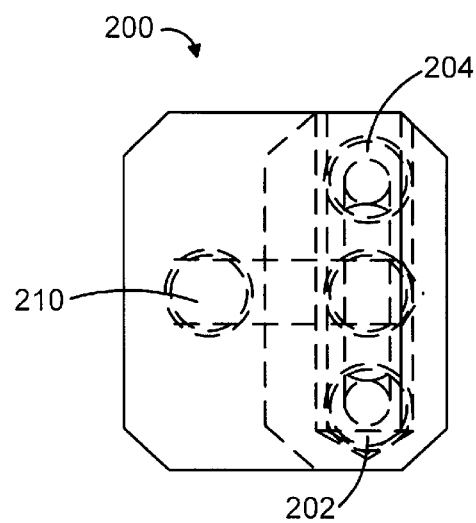
FIG. 5 is an end view, along the A–A' line, of the mixing block of FIG. 2A.

As best shown in FIGS. 5 and 6 the axes of the coating component inlets 202 and 204 are coplanar. The solvent inlet 210 is located above coating component inlets 202 and 204 (as viewed in FIG. 3). Solvent entering the solvent inlet 210 flows downward through passage 233 and then into transverse passage 235 which connects the coating component inlets 202 and 204. During normal painting and mixing, the coating components do not flow through the passage 235 because the flow of solvent is shut off and therefore the passage 235 is maintained at the same pressure as the coating components.

Referring now specifically to FIG. 1, the supply station 100 contains coating component reservoirs 102 and 104 for each coating component of the multi-component coating system and a solvent reservoir 106 for the solvent necessary to clean the mixing block 200, as described above. Each coating component of the multi-component coating system has it own separate reservoir. FIG. 1 shows a representative two component system. In this case, a hydroxy functional clearcoat and a polyisocyanate hardener with the clearcoat and hardener each in its own coating component reservoir 102 and 104, respectively. Solvent reservoir 106 holds the solvent necessary for the cleaning of the mixing block 200.

The coating component reservoirs 102 and 104 are connected to a pump 108 which in the embodiment depicted in FIG. 1 is a pneumatic pump 108 which is responsible for driving piston pumps 108a and 108b which in turn supply the coating materials to mixing block 200. Pneumatic pump 108 drives piston pump 108a via a plate (not pictured) and piston pump 108b via two tie rods 109. Piston pumps 108a and 108b are connected to the clearcoat and hardener reservoirs 102 and 104 by supply lines 110 and 112, respectively. Supply lines 110 and 112 have in-line filters 130 and 132, respectively, to remove any impurities or dirt from the coating components. The pneumatic pump 108 may be adjusted in order to cause piston pumps 108a and 108b to provide a wide range of ratios of clearcoat to hardener. The solvent reservoir 106 is also connected to a pump via supply line 116. Preferably, the solvent reservoir 106 is connected to a second pneumatic pump 114, which in turn is connected via a plate (not shown) to a piston pump 114a. Pneumatic pumps 108 and 114 drive piston pumps 108a, 108b and 114a which in turn supply their respective materials to a pneumatic control station 118 via supply lines. The clearcoat and hardener are supplied via supply lines 120 and 122, respectively. The solvent is supplied via supply lines 124 and 126. Supply lines 124 and 126 are connected to piston pump 108b so that the solvent can be passed through piston pump 108b in order to lubricate piston pump 108b's center shaft. The solvent used to lubricate the center shaft of piston pump 108b does not at any time come into contact with the hardener being pumped by piston pump 108b. As described above pneumatic pump 108 is connected to piston pumps 108a and 108b, however, it should be appreciated that pumps 108a and 108b need not be piston pumps but rather could be any type of suitable pump, such as a diaphragm pump or a centrifugal pump.

Pneumatic pumps 108 and 114 are driven by air pressure supplied by the control station 118. The amount of the air pressure delivered to pneumatic pumps 108 and 114 can be controlled by control nob 128. After being delivered to a manifold 131 on control station 118 the ratio of clearcoat to hardener can be ascertained by checking specimen bottles 133 and 135, respectively. Preferably specimen bottles 133 and 135 are clear.

The clearcoat and hardener flow to the mixing block 200 through flexible coating lines 134 and 136, respectively, which are conventional flexible hoses. The solvent flows to the mixing block 200 through a solvent supply line 138, which is also a conventional flexible hose. Air is supplied to spray gun 300 through an air supply line 140 which is shown running under mixing block 200. Air supply line 140 is also a conventional flexible hose. The amount of air supplied to spray gun 300 is controlled by a conventional pressure regulator 142.

The air supplied to spray gun 300 may also incorporate a vapor injection cure system. Such a system allows for the injection of an atomized curing agent or accelerates into the air stream. This permits further control of the cure rate of the mixed material of the multi-component coating system upon application by spray gun 300. For example, a vaporous amine may be used as an accelerator so as to increase the cure rate of the clearcoat/hardener system.

Once the clearcoat and hardener have been delivered to mixing block 200 (FIG. 2A) through coating component inlets 202 and 204 each coating component enters into the upstream end 216 and 218 of a respective one of the intersecting flow channels 212 and 214 (FIG. 1). In this case the clearcoat enters through coating component inlet 204 and the hardener through coating component inlet 202. The clearcoat and hardener proceed toward mixing chamber 228 (FIG. 2A) wherein the streams of material collide thereby causing the two coating components to mix.

The mixed material then proceeds to leave the mixing chamber 228 through the remainder of the intersecting flow channels 212 and 214. At their downstream ends 220 and 222 both intersecting flow channels 212 and 214 empty into mixed material reservoir 224 where the clearcoat and hardener undergo further mixing. The mixed material then exits the mixing block 200 through outlet 226 and is supplied to spray gun 300 (FIG. 1) by spray gun supply line 144. The mixed material is applied by a user to any desired surface by depressing spray gun trigger 146.

When a coating job is completed or it is necessary to change colors or coatings, mixing block 200 is cleaned with solvent in the following manner. Referring to FIGS. 1, 2A and 3, solvent is supplied to mixing block 200 through solvent inlet 210 which is connected to solvent supply line 138 (FIG. 1). The solvent line need not be connected to the mixing block until clean up is required, thereby additionally reducing the weight being handled by the user while spraying. Once the solvent enters the mixing block 200, it flows downward (as viewed in FIG. 3) through through passage 233 and into passage 235. Some of the solvent in passage 235 flows back into coating component inlets 202 and 204 due to their close proximity to passage 235. The remaining solvent flows downstream through mixing block 200 thereby cleaning intersecting flow channels 212 and 214, mixed material reservoir 224 and outlet 226. The flow of solvent through passage 233 and passage 235 enables the solvent to clean coating component inlets 202 and 204, as well as quick release couplings 206 and 208 (FIG. 1). As a result, mixing block 200 is cleaned with a high degree of efficiency for its next use. The elimination of manually operated valves mounted to the mixing block 200 enables an operator to switch from coating materials to solvent by merely flipping one selector switch 150 on the control station 118. Therefore, the present invention also provides a simplified switching mechanism in that it requires a user to use only one hand to switch from coating materials to solvent.

In addition to providing for mixing it should also be appreciated that a mixing block 200 with intersecting flow channels 212 and 214 and or mixed material reservoir 224 reduces or completely eliminates sputtering and/or pump pulsation phenomena even at relatively low pump pressures. Sputtering and/or pump pulsation is eliminated to such a degree that low pressure applications (i.e., in the range of about 20 psi to about 50 psi) are possible with mixing block 200. Alteratively, more conventional air pressures ranging up to about 80 psi or higher can also be used.

Mixing block 200 is designed so as to be effective from an increased mounting distance compared to the prior art. Accordingly, it is not necessary to mount mixing block 200 near spray gun 300. Rather mixing block 200 can frequently be positioned 25–40 inches away from spray gun 300. This positioning permits more flexible, user friendly application characteristics which improves the application properties of multi-component coating systems to various surfaces at various angles. In addition, with mixing block 200 positioned a significant distance away from spray gun 300 an operator is subject to less fatigue during extended use of the apparatus.

Another advantage associated with the present mixing block 200 is that the quick release couplings with check valves permit the operator to save all of the system coating components and solvent located in the supply lines if mixing block 200 is removed from coating apparatus 170. Accordingly, the amount of waste is reduced from approximately 1600 ml from a typical application of the prior art T-shaped mixing block to just 50 ml from mixing block 200. (About 50 ml of fluid is normally contained between the mixing block 200 and spray gun 300 in line 144.) Therefore, mixing block 200 also serves as a cost effective method in reducing an operator's coating component and solvent wastes.

Figure 7:
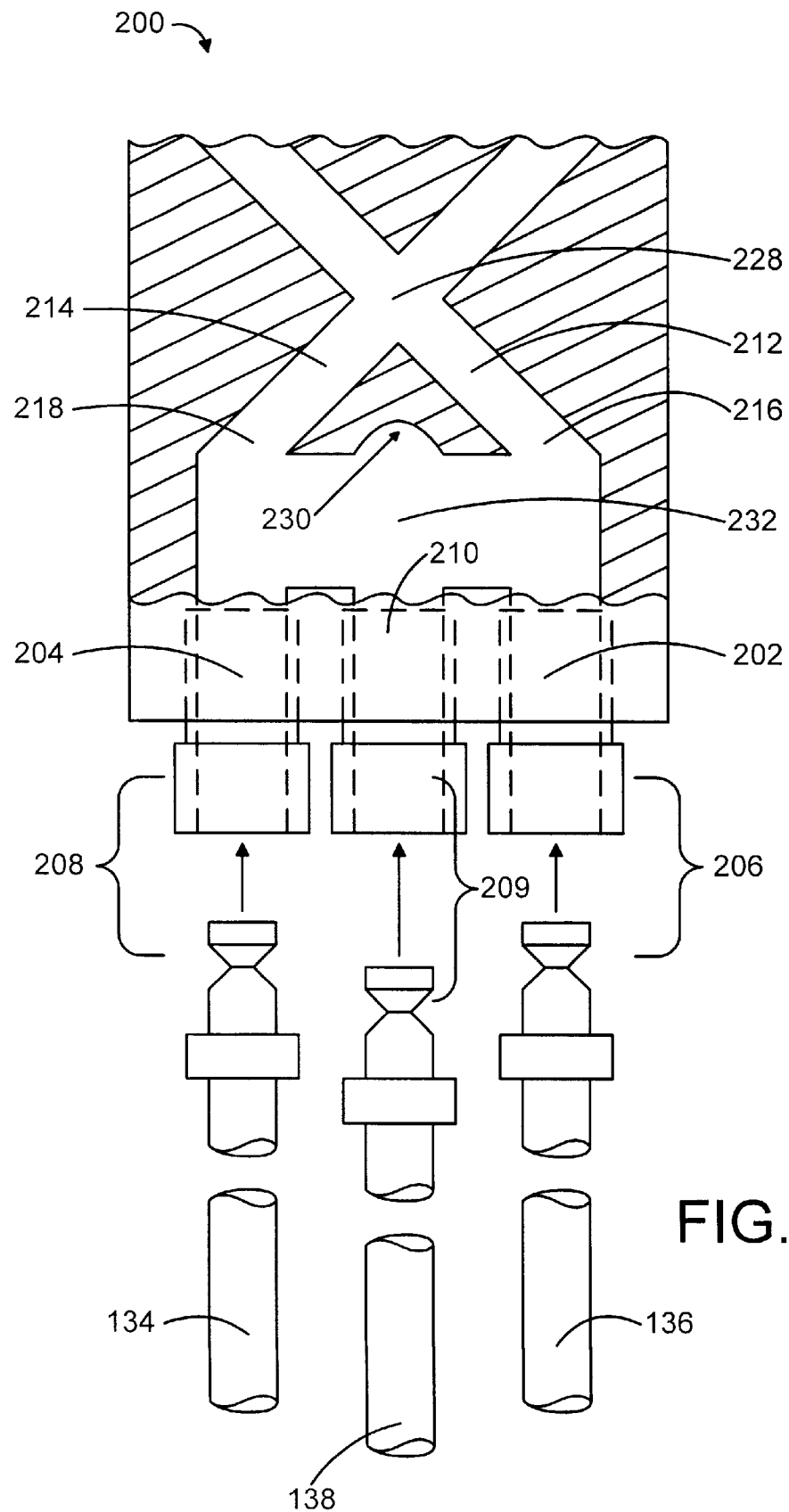
FIG. 7 is an enlarged view, partly in cross section, of the inlet area of another embodiment of the mixing block of the present invention.

FIG. 7 shows another embodiment of mixing block 200 in which coating component inlets, 202 and 204, and solvent inlet 210 are positioned in mixing block 200 so that there axes are coplanar. In such an embodiment solvent inlet 210 includes solvent diverter 230 and solvent chamber 232. In this embodiment as solvent flows into mixing block 200 through solvent inlet 210, a portion of the solvent is directed upstream into coating component inlets 202 and 204 by solvent diverter 230. This upstream flow of solvent causes coating component inlets 202 and 204 to be cleaned by the solvent. The remainder of the solvent flows downstream through mixing block 200 thereby cleaning intersecting flow channels 212 and 214, mixed material reservoir 224 and outlet 226. In this embodiment solvent diverter 230 and solvent chamber 232 facilitate thorough and easy cleaning of mixing block 200's internal passages after each use or the like. Cleaning mixing block 200 is accomplished as described above.

It is, of course, not possible to describe every conceivable combination of components for purposes of describing the present invention, but one of ordinary skill in the art will recognize that many further combinations and permutations of the present invention are possible. Although the mixing block of the present invention has been described above for use with a multi-component coating system the mixing block of the present invention can be used with any multi-component system in which mixing is required. Such systems can include, for example, multi-component adhesives, pesticides, and lubricants. Accordingly, the present invention is intended to embrace all such alternatives, modifications and variations that fall within the spirit and scope of the appended claims.

What is claimed is:

1. A mixing block for mixing components of a multi-component system as the components flow through the mixing block comprising:

a block;

at least one mixing chamber within the block;

at least two component inlets, formed in the block, wherein each component inlet receives a respective component or components of the multi-component system at an upstream end of the mixing block;

a mixed material reservoir adjacent a downstream end of the mixing block;

at least two flow channels through the block, wherein an upstream end of each of the flow channels is connected to at least one of the component inlets and a downstream end of each of the flow channels is connected to the mixed material reservoir and wherein between the upstream end and the downstream end each of the at least two flow channels is connected to the mixing chamber; and the mixed material reservoir being connected to an outlet.

2. The mixing block of claim 1 further comprising:

a solvent inlet upstream of the at least one mixing chamber, wherein the solvent inlet receives, at the upstream end of the mixing block, solvent for use in cleaning the mixing block; and a solvent chamber, wherein the solvent chamber is connected to both the solvent inlet and the upstream ends of the intersecting flow channels.

3. The mixing block of claim 1 further comprising:

a solvent inlet upstream of the at least one mixing chamber, wherein the solvent inlet receives, at the upstream end of the mixing block, solvent for use in cleaning the mixing block;

a through passage having a first end and a second end;

a passage;

wherein the solvent inlet is connected to the first end of the through passage, wherein the second end of the through passage is connected to the passage, wherein the passage is connected to both the first component inlet and the second component inlet.

4. The mixing block of claim 3 wherein the solvent inlet is so designed that the incoming solvent is directed onto and into the area where the individual components of the multi-component system enter the mixing block.

5. The mixing block of claim 1 wherein the at least two flow channels intersect each other at angles of between about 25° and about 90° to form the at one least mixing chamber.

6. The mixing block of claim 1 wherein the at least two flow channels intersect each other at an angle of about 45° to form the at least one mixing chamber.

7. The mixing block of claim 1 further comprising flow channels which are tapered so as to decrease in size toward their downstream ends.

8. The mixing block of claim 1 further comprising flow channels which are tapered so as to increase in size toward their downstream ends.

9. The mixing block of claim 1 further comprising flow channels which have square cross sections.

10. The mixing block of claim 1 further comprising flow channels which have cylindrical cross sections.

11. The mixing block of claim 1 further comprising flow channels which have substantially U-shaped cross sections.

12. The mixing block of claim 1 wherein the block is formed from metal.

13. The mixing block of claim 12 wherein the metal used for the block is selected from the group consisting of aluminum, brass, copper, magnesium, nickel, steel, stainless steel, and titanium and alloys thereof.

14. The mixing block of claim 1 wherein the block is formed from plastic.

15. The mixing block of claim 1 wherein the mixing block is incorporated into a spray gun.

16. The mixing block of claim 1, wherein the at least one mixing chamber is a substantially X-shaped mixing chamber.

17. A mixing block for mixing components of a multi-component system as the components flow through the mixing block comprising:
   a block;
   at least one mixing chamber within the block;
   at least two component inlets, formed in the block, wherein each component inlet receives a respective component or components of the multi-component system at an upstream end of the mixing block;
   a solvent inlet upstream of the at least one mixing chamber, wherein the solvent inlet receives, at the upstream end of the mixing block, solvent for use in cleaning the mixing block;
   a mixed material reservoir adjacent a downstream end of the mixing block;
   at least two flow channels, wherein an upstream end of each of the flow channels is connected to at least one of the component inlets and a downstream end of each of the flow channels is connected to the mixed material reservoir, the flow channels intersecting each other at an angle of between about 25° and 90°; and
   the mixed material reservoir being connected to an outlet;
   wherein the number of component inlets and the number of intersecting flow channels is equal to or greater than the number of components in the multi-component system.

18. The mixing block of claim 17 further comprising:
   a through passage having a first end and a second end;
   a passage;
   wherein the solvent inlet is connected the first end of through passage, wherein the second end of the through passage is connected to the passage, wherein the passage is connected to both the first component inlet and the second component inlet.

19. The mixing block of claim 17 further comprising intersecting flow channels which are tapered so as to decrease in size toward their downstream ends.

20. The mixing block of claim 17 further comprising intersecting flow channels which are tapered so as to increase in size toward the downstream ends.

21. The mixing block of claim 17 further comprising intersecting flow channels which have square cross sections.

22. The mixing block of claim 17 further comprising intersecting flow channels which have cylindrical cross sections.

23. The mixing block of claim 17 further comprising intersecting flow channels which have substantially U-shaped cross sections.

24. The mixing block of claim 17 wherein the block is formed from metal.

25. The mixing block of claim 24 wherein the metal used for the mixing block is selected from the group consisting of aluminum, brass, copper, magnesium, nickel, steel, stainless steel, and titanium and alloys thereof.

26. The mixing block of claim 17 wherein the block is formed from plastic.

27. The mixing block of claim 17 wherein the mixing block is incorporated into a spray gun.

28. The mixing block of claim 17 wherein the at least two flow channels intersect each other an angle of about 45° to form the at least one mixing chamber.

29. The mixing block of claim 17 further comprising a solvent chamber, wherein the solvent chamber is connected to both the solvent inlet and the upstream ends of the intersecting flow channels.

30. The mixing block of claim 17, wherein the at least one mixing chamber is a substantially X-shaped mixing chamber.

31. An apparatus for applying a multi-component coating system comprising:
   (A) a block;
   at least one mixing chamber within the block;
   at least two coating component inlets, formed in the block, wherein each coating component inlet receives a respective coating component or components of the multi-component system at an upstream end of the mixing block;
   a solvent inlet upstream of the at least one mixing chamber, wherein the solvent inlet receives, at the upstream end of the mixing block, solvent for use in cleaning the mixing block;
   a mixed material reservoir adjacent a downstream end of the mixing block, wherein the mixed material reservoir is connected to an outlet;
   at least two flow channels, wherein an upstream end of each of the flow channels is connected to at least one of the coating component inlets and a downstream end of each of the flow channels is connected to one mixed material reservoir, the flow channels intersecting each other at an angle of between about 25° and 90°; and
   a through passage having a first end and a second end;
   a passage;
   wherein the solvent inlet is connected to the first end of through passage, wherein the second end of the through passage is connected to the passage, wherein the passage is connected to both the first coating component inlet and the second coating component inlet;
   (B) a solvent storage reservoir;
   (C) a solvent pump;
   (D) a first solvent conduit connecting the solvent storage reservoir to the solvent pump;
   (E) a control device and second and third solvent conduits, wherein the second and third conduits connect the solvent pump to the control device, wherein the control device selectively enables the flow of either solvent or coating components;

(F) a fourth solvent conduit device which connects the control device to the mixing block;

(G) at least two coating component reservoirs;

(H) a coating component pump;

(I) a first set of at least two coating component conduits which connect the at least two coating component reservoirs to the coating components pump;

(J) a second set of at least two coating component conduits which connect the coating component pump to the control device, wherein the control the control device selectively enables the flow of either solvent or coating components;

(K) a third set of at least two coating component conduits, wherein each of the at least two coating component conduits connect the control device the mixing block;

(L) a conduit which connects the mixing block to an air driven sprayer head; and (M) at least one source of compressed air and at least one air conduit which connects the at least one source of compressed air to the air driven sprayer head;

wherein the mixing block for mixing the at least two coating components of the multi-component coating system contains at least three inlets with at least one inlet dedicated to the input of solvent and the remaining inlets are dedicated to the input of the coating components, wherein the mixing block for mixing the at least two coating components of the multi-component coating system contains at least one substantially X-shaped mixing chamber, wherein the at least two coating components each enter at least one leg of the at least one substantially X-shaped mixing chamber separately and mix at the each intersection of the at least one substantially X-shaped mixing chamber.

32. An apparatus for applying a multi-component coating system comprising:

a block;

at least one mixing chamber within the block;

at least two coating component inlets, formed in the block, wherein each coating component inlet receives a respective coating component or components of the multi-component coating system at an upstream end of the mixing block;

a mixed material reservoir adjacent a downstream end of the mixing block;

at least two flow channels through the block, wherein an upstream end of each the flow channels is connected to at least one of the coating component inlets and a downstream end of each of the flow channels is connected to one mixed material reservoir and wherein between the upstream end and the downstream end each of the at least two flow channels is connected to the mixing chamber;

the mixed material reservoir being connected to an outlet; and at least one of each of a storage device, a pump, a conduit and an application device which store, pump, supply and apply, respectively, the coating components of the multi-component coating system.

33. An apparatus for applying a multi-component system comprising:

(A) a block;

at least one mixing chamber within the block;

at least two component inlets, formed in the block, wherein each component inlet receives a respective component or components of the multi-component system at an upstream end of the mixing block;

a solvent inlet upstream of the at least one mixing chamber, wherein the solvent inlet receives, at the upstream end of the mixing block, solvent for use in cleaning the mixing block;

a mixed material reservoir adjacent a downstream end of the mixing block;

at least two flow channels, wherein an upstream end of each of the flow channels is connected to at least one of the component inlets and a downstream end of each of the flow channels is connected to one mixed material reservoir, the flow channels intersecting each other at an angle of between about 25° and 90°;

a solvent chamber, wherein the solvent chamber is connected to both the solvent inlet and the upstream ends of the intersecting flow channels;

the mixed material reservoir being connected to an outlet;

(B) a solvent storage reservoir;

(C) a solvent pump;

(D) a first solvent conduit which connects the solvent storage reservoir to the solvent pump;

(E) a control device and second and third conduits, wherein the second and third conduits connect the solvent pump to the control device, wherein the control device selectively enables the flow of either solvent or components;

(F) a fourth solvent conduit device which connects the control device to the mixing block;

(G) at least two component reservoirs;

(H) a component pump;

(I) a first set of at least two component conduits which connect the at least two component reservoirs to the component pump;

(J) a second set of at least two component conduits which connect the component pump to the control device, wherein the control device selectively enables the flow of either solvent or components;

(K) a third set of at least two component conduits, wherein each of the at least two component conduits connect the control device to the mixing block;

(L) a conduit which connects the mixing block to an air driven sprayer head; and (M) at least one source of compressed air and at least one air conduit which connects the at least one source of compressed air to the air driven sprayer head;

wherein the mixing block for mixing the at least two components of the multi-component system contains at least three inlets with at least one inlet dedicated to the input of solvent and the remaining inlets are dedicated to the input of the components, wherein the mixing block for mixing the at least two components of the multi-component system contains at least one substantially X-shaped mixing chamber, wherein the at least two components each enter at least one leg of the at least one substantially X-shaped mixing chamber separately and mix at each intersection of the at least one substantially X-shaped mixing chamber.

* * * * *

UNITED STATES PATENT AND TRADEMARK OFFICE
CERTIFICATE OF CORRECTION

| | | |
|---|---|---|
| PATENT NO. | : 6,105,880 | Page 1 of 1 |
| APPLICATION NO. | : 09/219819 | |
| DATED | : August 22, 2000 | |
| INVENTOR(S) | : Kurt D. Bazil et al. | |

It is certified that error appears in the above-identified patent and that said Letters Patent is hereby corrected as shown below:

In the Specification

Column 1, Line 35, delete "aminelepoxy", insert --amine/epoxy--.

Column 6, Lines 9 & 10, delete "FIGS. 8A and 8B)", insert --Figure 2A have cylindrical cross sections (see Figures 8A and 8B)--.

Column 6, Line 42, delete "212 25 and 214", insert --212 and 214--.

Signed and Sealed this
First Day of September, 2015

Michelle K. Lee
*Director of the United States Patent and Trademark Office*